(12) United States Patent
Criel et al.

(10) Patent No.: US 12,066,150 B2
(45) Date of Patent: Aug. 20, 2024

(54) COMPOSITE PRESSURE VESSEL WITH REINFORCEMENT ELEMENT

(71) Applicant: Plastic Omnium New Energies France, Lyons (FR)

(72) Inventors: Bjorn Criel, Brussels (BE); Geert Nouwen, Brussels (BE)

(73) Assignee: Plastic Omnium New Energies France, Lyons (FR)

( * ) Notice: Subject to any disclaimer, the term of this patent is extended or adjusted under 35 U.S.C. 154(b) by 0 days.

(21) Appl. No.: 18/001,799

(22) PCT Filed: Jun. 15, 2021

(86) PCT No.: PCT/EP2021/066143
§ 371 (c)(1),
(2) Date: Dec. 14, 2022

(87) PCT Pub. No.: WO2021/255041
PCT Pub. Date: Dec. 23, 2021

(65) Prior Publication Data
US 2023/0194050 A1    Jun. 22, 2023

(30) Foreign Application Priority Data

Jun. 17, 2020    (EP) .................................... 20180605

(51) Int. Cl.
*F17C 1/16*    (2006.01)
(52) U.S. Cl.
CPC ........ *F17C 1/16* (2013.01); *F17C 2201/0109* (2013.01); *F17C 2203/013* (2013.01);
(Continued)
(58) Field of Classification Search
CPC ................ F17C 1/16; F17C 2201/0109; F17C 2203/013; F17C 2203/0604;
(Continued)

(56) References Cited

U.S. PATENT DOCUMENTS

| | | | |
|---|---|---|---|
| 5,462,193 A * | 10/1995 | Schoo | F17C 1/16 220/652 |
| 7,731,046 B2 * | 6/2010 | Johnson | E04C 2/365 428/292.1 |

(Continued)

FOREIGN PATENT DOCUMENTS

| | | |
|---|---|---|
| CN | 108139023 A | 6/2018 |
| DE | 197 49 950 A1 | 5/1999 |

(Continued)

OTHER PUBLICATIONS

English Machine Translation of DE-19749950-A1 (Year: 1999).*

(Continued)

*Primary Examiner* — Nathan J Jenness
*Assistant Examiner* — Laura E. Parker
(74) *Attorney, Agent, or Firm* — Oblon, McClelland, Maier & Neustadt, L.L.P.

(57) ABSTRACT

A reinforcement element, suitable for composite pressure vessel, may be configured to be inserted and to fill in a hollow shaft of a plastic liner of the composite pressure vessel, the hollow shaft connecting opposite walls of the liner. The reinforcement element may include a central part and two external parts constituted by a plurality of continuous fibres impregnated with a first resin. The central part of the reinforcement element may have a dimension substantially equal to the dimension of the hollow shaft and being a full part. The two external parts may be able to be unfolded and fixed on the external surface of opposite walls of the liner. A composite pressure vessel may include such a reinforcement element.

16 Claims, 8 Drawing Sheets

(52) U.S. Cl.
CPC .............. *F17C 2203/0604* (2013.01); *F17C 2203/066* (2013.01); *F17C 2203/0673* (2013.01); *F17C 2209/2109* (2013.01); *F17C 2209/2154* (2013.01); *F17C 2221/012* (2013.01); *F17C 2221/033* (2013.01); *F17C 2221/035* (2013.01); *F17C 2270/0168* (2013.01)

(58) Field of Classification Search
CPC ........ F17C 2203/066; F17C 2203/0673; F17C 2209/2109; F17C 2209/2154; F17C 2270/0168; F17C 1/02; F17C 2203/011; F17C 2209/23; F17C 1/08; B60K 2015/03032; B60K 2015/03493
USPC ........................................................ 220/590
See application file for complete search history.

(56) References Cited

U.S. PATENT DOCUMENTS

| | | | |
|---|---|---|---|
| 2004/0026431 A1 | 2/2004 | Jones | |
| 2005/0011891 A1* | 1/2005 | Austerhoff | B60K 15/03006 220/4.12 |
| 2018/0283611 A1 | 10/2018 | Bernard et al. | |
| 2018/0347755 A1 | 12/2018 | Zhao et al. | |
| 2019/0107251 A1 | 4/2019 | Zhao et al. | |
| 2020/0318789 A1* | 10/2020 | Lynch | F17C 1/02 |
| 2021/0080060 A1* | 3/2021 | Blair | F17C 1/02 |
| 2022/0034452 A1 | 2/2022 | Wahl et al. | |

FOREIGN PATENT DOCUMENTS

| | | | | |
|---|---|---|---|---|
| DE | 19749950 A1 * | 5/1999 | | F17C 1/08 |
| EP | 0 091 177 A1 | 10/1983 | | |
| EP | 1 067 300 A1 | 1/2001 | | |
| EP | 1 409 917 A1 | 4/2004 | | |
| EP | 4134582 A1 * | 2/2023 | | |
| FR | 1.431.135 A | 3/1966 | | |
| FR | 3 089 160 A1 | 6/2020 | | |
| JP | 11-512804 A | 11/1999 | | |
| JP | 2006-38154 A | 2/2006 | | |
| JP | 2011-504567 A | 2/2011 | | |
| WO | WO 00/58662 A1 | 10/2000 | | |
| WO | WO 2013/162428 A1 | 10/2013 | | |
| WO | WO 2018/007367 A1 | 1/2018 | | |
| WO | WO-2021144741 A1 * | 7/2021 | | F17C 3/08 |

OTHER PUBLICATIONS

International Search Report issued Sep. 30, 2021 in PCT/EP2021/066143 filed on Jun. 15, 2021, 3 pages.

Japanese Office Action issued on May 15, 2023 in Japanese Patent Application No. 2022-577709 (with English translation), 6 pages.

* cited by examiner

COMPOSITE PRESSURE VESSEL WITH REINFORCEMENT ELEMENT

CROSS-REFERENCE TO RELATED APPLICATIONS

The present application is the national stage of international application PCT/EP2021/066143, filed on Jun. 15, 2021, and claims the benefit of the filing date of European Appl. No. 20180605.6, filed on Jun. 17, 2020.

TECHNICAL FIELD OF THE INVENTION

The present invention concerns composite pressure vessels of the type comprising an inner liner made of plastic and forming an inner cavity, enclosed in a fiber reinforced polymer shell commonly used as compressed natural gas (CNG) tanks, compressed hydrogen gas (CHG) tanks, liquefied petroleum gas (LPG) tanks, and the like. In particular, the composite pressure vessels of the present invention are particularly resistant to deformation. The present invention relates also to reinforcement elements for said composite pressure vessels, to the method for manufacturing said composite pressure vessels and to the vehicle comprising at least one of them.

BACKGROUND OF THE INVENTION

Composite pressure vessels for storing a fluid at high pressure are advantageous for their lightweight over metal pressure vessels, in particular in case the vessels are mobile, such as pressure vessels for storing a compressed fluid as fuel in the field of transportation (automotive, aerospace, railway, and the like). A composite pressure vessel typically comprises an inner liner made of a polymer, e.g., PA or HDPE. The inner liner defines an inner cavity and generally comprises a substantially cylindrical portion extending along a longitudinal axis, X1, flanked on either side by a dome shaped cap closing the inner cavity. At least one opening equipped with corresponding connectors is provided for injecting and extracting a pressurized fluid into and out of the inner cavity. To stiffen the structure and make it resistant to the high pressure inside the inner cavity when the pressure vessel is filled with a pressurized fluid, the inner liner is enclosed in a fiber-reinforced polymer shell. An example of composite pressure vessel is described e.g., in WO2018007367. Unfortunately, due to their cylindrical shape, composite pressure vessel are difficult to insert into the structure of the vehicle The document EP1067300 discloses a composite pressure vessel, which has a shape other than cylindrical allowing an easier integration on the vehicle, in place of the current petrol tank for example. The composite pressure vessel comprises a plurality of tubular elements comprising reinforcing strips passing through the tubular elements and connected to the faces of the internal envelope adjacent to said tubular elements. Nevertheless, such a composite pressure vessel is submitted to high shear stress, in particular to interlaminar shear stress, during pressure cycle variation, which could lead to a premature brake of the composite pressure vessel and reduce the resistance to the burst pressure. Moreover, it is not easy to position the same strip through two different tubular elements.

There is therefore a need for a composite pressure vessel supporting high pressures variations, which could have a shape other than cylindrical allowing an easier integration on the vehicle and easy to manufacture.

The present invention proposes a solution to the problem of the shape limitation of the composite pressure vessels reducing the shear stress in the composite pressure vessel induced during pressure cycle variation.

SUMMARY OF THE INVENTION

In particular, the present invention concerns a reinforcement element for composite pressure vessel, said reinforcement element being provided to be inserted and to fill in a hollow shaft of a plastic liner of the composite pressure vessel, said hollow shaft comprising a central part and connecting opposite walls of the plastic liner, said reinforcement element comprising a central part and two external parts, the reinforcement element being constituted by a plurality of continuous fibers impregnated with a first resin, the central part of the reinforcement element having a dimension substantially equal to the dimension of the central part of the hollow shaft and being a filled part, the two external parts being able to be unfolded and fixed on the external surface of opposite walls of the liner. Preferably the central part and two external parts of the reinforcement element consist of, consist essentially of, a plurality of continuous fibers impregnated with a first resin.

By the expression "continuous fibers", we intend to mean that the fibers of the reinforcement element are in one piece all along the surface in contact with the liner and are parallel to the profile of the surface of the liner, the lengths of the fibers at the extremities of the external parts being such that they permit filling in the outer parts of the hollow shaft that are flared and form a depression on the external surface of the liner. In other words, the extremities of the external parts provided to be unfolded may preferably have a bevelled shape to maximize the contact with the liner. By the expression "the two external parts being able to be unfolded", we intend to mean that all fibers, of the plurality of continuous fibers impregnated with a first resin, at the two external parts of the reinforcement element, are flexible enough to be able to unfold so as to conform to the contour of the outer parts of the hollow shaft and cover the external surface of the opposite walls adjacent to the contour of the outer parts of the hollow shaft. It's understood that the two external parts of the reinforcement element are deployed and spread over the external parts. It is like a peeled banana held in one hand, the banana skin is unfolded so as to conform to the contour of the gripping thumb and forefinger and cover the rest of the hand adjacent to the contour of the gripping thumb and forefinger. By the expression "being a filled part", we intend to mean that the fibers not unfolded, of the plurality of continuous fibers at the central part of the reinforcement element, are impregnated with a first resin.

By "dimension of the central part of the reinforcement element" and "dimension of the center part of the hollow shaft", we intend to mean the dimension of the central part in a transversal section of the reinforcement element and the hollow shaft respectively. Such a transversal section is given in reference to a longitudinal direction of the reinforcement element and the hollow shaft respectively, which can be considered as direction of a main axis of the reinforcement element and the hollow shaft respectively. Typically, the longitudinal direction of the reinforcement element and the hollow shaft respectively extends perpendicularly to both opposite walls of the plastic liner. For example, said dimension relates to a diameter of the central part.

It is also understood that the entire of the reinforcement element, which comprises a central part and two external parts, consists of a plurality of continuous fibers extending over the entire length of the reinforcement element.

The continuous fibers start at a top "horizontal" surface of the liner go through the hollow shaft of the plastic liner and go up to the opposite bottom "horizontal" surface of the liner. By the expression "horizontal surface", we preferably intend to mean a surface of the plastic liner which is horizontal when the composite pressure vessel is oriented such that the main axis of the hollow shaft is vertical compared to the ground.

According to a preferred embodiment, the reinforcement element for composite pressure vessel according to the invention is such that the ratio between the surface of one unfolded external part of the reinforcement element provided to be fixed to the external surface of one wall of the liner and the section of the central part of the reinforcement element is at least equal to or greater than 5. A ratio between the surface of one unfolded external part provided to be fixed to of the external surface of one wall of the liner and the section of the central part at least equal to or greater than 5 permits advantageously a better distribution of the stress induced on the structure of the composite pressure vessel and reduces the shear. Moreover, said ratio permits to increase the contact surface to reduce the shear stress, especially in the resin making the connection between the reinforcing element and the fiber-reinforced polymer shell enclosing the plastic liner. This ratio allows a limited volume loss for a given car environment. The shear stresses are particularly tested during the pressure cycling test on the composite pressure vessels as defined in the addendum 109: regulation n$^r$ 110 dated 25 Jun. 2014 and addendum 133: regulation n$^r$ 134 dated 25 Jun. 2015 concerning the "Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions" of the United Nations. Subsequently, the quantity of the material used and thus the weight of the reinforcement element and of the fiber-reinforced polymer shell of the composite pressure vessel can be limited.

Preferably, a limited size cross section between 100 mm$^2$ and 300 mm$^2$ of the central part of the reinforcement element and an acceptable equivalent connecting area for load transmission to the fiber-reinforced polymer shell enclosing the plastic liner, this equivalent connecting surface being typically between 3000 and 15000 mm$^2$ for a CNG vessel with a nominal working pressure of 200 to 250 bar. By the expression "equivalent connecting surface", we intend to mean the external surface of an unfolded external part of the reinforcement element provided to be in contact with the internal surface of the fiber-reinforced polymer shell enclosing the plastic liner. Preferably, the "equivalent connecting surface" is equal to the surface defined by an external end part of a hollow shaft, i.e. an opening of the hollow shaft, on the external surface of the plastic liner.

Preferably, the surfaces of the two unfolded external parts of the reinforcement element provided to be fixed to of the external surface of the walls of the plastic liner are equal. This permits to obtain a good balance of the stress induced by the composite pressure vessel.

By the expression "external surface" or "internal surface" of an object, we intend to mean respectively a surface in the opposed direction of the internal part of the composite pressure vessel and a surface in the direction of the internal part of the composite pressure vessel.

According to a preferred embodiment, the reinforcement element for a composite pressure vessel according to the invention is such that the central part of the reinforcement element is a rod. This permits advantageously to have an easiest insertion of the reinforcement element in a hollow shaft of the plastic liner of the composite pressure vessel. This circular cross section allows also a homogenous loading distribution all around the reinforcement element, but other cross-sections could be possible such as square, rectangular, multiple lobs.

According to a preferred embodiment, the reinforcement element for a composite pressure vessel according to the invention is such that the continuous fibers of the central part of the reinforcement element and of the two external parts of the reinforcement element are selected from the groups consisting of glass fibers, basalt fibers, carbon fibers and aramid fibers. Preferably, the first resin impregnating the continuous fibers is a thermoplastic resin or thermosetting resin. More preferably, the first resin is a polymeric resin, such as an epoxy resin, a polyester resin or a polyurethane resin, which impregnates the continuous fibers of the central part and the two external parts of the reinforcement element.

Compared to a reinforcement element made of steel, the reinforcement element according to the invention allows a weight and volume reduction. Moreover, the use of continuous fibers permits to avoid the needs of connections or an interlocking leading to a weight and volume reduction of the reinforcement element and the fiber-reinforced polymer shell enclosing the plastic liner but also to a decreasing of the stress concentrations.

An object of the present invention concerns also a composite pressure vessel comprising:
a) a plastic liner comprising pairs of opposite surfaces, the opposite surfaces of at least one of these pairs being connected by a plurality of hollow shafts whose ends are in one piece with these surfaces, the plastic liner further comprising reinforcement elements traversing the hollow shafts and connected to the external surfaces of the plastic liner adjacent to the central part of the hollow shafts,
b) a fiber-reinforced polymer shell enclosing the plastic liner, said fiber-reinforced polymer shell being made of continuous fiber-reinforced composite matrix, comprising reinforcing fibers and a second resin matrix,
wherein the reinforcement element comprising a central part and two external parts constituted by a plurality of continuous fibers impregnated with a first resin, the central part of the reinforcement element having a dimension substantially equal to the dimension of the hollow shaft and being a full part, the two external parts being unfolded and fixed on the external surface of opposite walls of the plastic liner,
wherein the continuous fibers of the reinforcement element are parallel with the external surface of opposite walls of the liner and the surface of the hollow shaft, The composite pressure vessel according to the invention supports high pressures variations and has an easier integration on the vehicle. The composite pressure vessel according the invention comprises a plastic liner comprising a plurality of hollow shafts, in said plastic liner a hollow shaft is traversed by a reinforcement element, which is connected to the external surfaces of the plastic liner adjacent to the hollow shaft.

Preferably, the central part of the hollow shafts has a tubular shape.

The plastic liner includes at least one opening for filling and emptying the tank. It is manufactured by injection or by rotational molding or by extrusion blow molding of a thermoplastic or thermosetting polymer material (abbreviated as "thermoset") such as, for example, polyethylene, polyamide, polyphthalamides, polyurethane, silicone. Advantageously, the thermoplastic polymer material is loaded with reinforcing fibers to constitute a composite material. The reinforcing fibers are, for example, glass fibers, carbon fibers, basalt fibers, aramid fibers, polymer fibers, silica fibers, polyethylene fibers, natural fibers, fibers metallic, metallic alloy fibers or ceramic fibers. These fibers increase the resistance to deformation of the plastic liner. In a polymeric material loaded with reinforcing fibers, the reinforcing fibers and the polymeric material are entangled to form a one-piece material. Such a composite material is described by the Applicant in its French patent application No. 18 72197 filed on Nov. 30, 2018.

Alternatively, the liner is produced by filament winding. An example of manufacturing a container by filament winding is described in patent document FR1431135A.

This plastic liner is then covered with a fiber-reinforced polymer shell, which will constitute the body of the tank, that is to say the resistant structure of the tank, which must be able to withstand the pressures exerted by the contained fluid. in the tank (abbreviated as "internal pressure"). The fiber-reinforced polymer shell is generally not required to seal the tank.

This fiber-reinforced polymer shell consists of:
a reinforcement generally made up of continuous fibers, glass, carbon, basalt, or the like such as silica fibers or even vegetable fibers,
a second resin which is either deposited at the same time as the fiber (filament winding process) or after the envelope has been produced to form a dry "preform". This dry preform is then consolidated to give it the necessary rigidity. This consolidation is carried out using an injection of the second resin or using an infiltration of the second resin through said preform (process by infusion), or even using an impregnation of the preform by the second resin under vacuum.

The first resin impregnating the plurality of continuous fibers of the central part and the two external parts of the reinforcement element is a thermoplastic resin or thermosetting resin. More preferably, the first resin is a polymeric resin, such as an epoxy resin, a polyester resin or a polyurethane resin.

The second resin of the fiber-reinforced polymer shell enclosing the plastic liner is also a thermoplastic resin or thermosetting resin. More preferably, the first resin is a polymeric resin, such as an epoxy resin, a polyester resin or a polyurethane resin. Preferably, the first and the second resin are made of the same material. The continuous fibers of the central part and the two external parts of the reinforcement element are selected from the groups consisting of glass fibers, basalt fibers, carbon fibers and aramid fibers.

According to a preferred embodiment, the composite pressure vessel according to the invention is such that the internal surface of the fiber-reinforced polymer shell enclosing the plastic liner and the external surface of the external parts of the reinforcement element are in direct contact. The absence of gap between the internal surface of the fiber-reinforced polymer shell enclosing the plastic liner and the external surface of the external parts of the reinforcement element reduces the risk of liner crack or the presence of weak point in the structure of the composite pressure vessel. Finally, the absence of gap permits to have a flat surface for the filament winding of the fiber-reinforced polymer shell.

According to a particular embodiment, the composite pressure vessel according to the invention is such that the surface of the reinforcement element in contact with the liner adheres to the surface of the liner.

According to a preferred embodiment, the composite pressure vessel according to the invention is such that an insert is located at the centre of the unfolded external part. Preferably, the insert is selected from the group of metallic insert and fiber-reinforced paste insert. The fibers of the fiber reinforced paste insert are selected from the group consisting of continues fiber, long chopped fiber, short chopped fiber, ground fiber or a combination of at least two thereof. Advantageously, an insert made out of a compatible material with the first resin of the reinforcement element and/or the second resin of the fiber-reinforced polymer shell allows an increased resistance to the pressure-cycling test according to the addendum 109: regulation nr 110 dated 25 Jun. 2014 and addendum 133: regulation nr 134 dated 25 Jun. 2015 concerning the "Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions" of the United Nations. Moreover, a high loading content of carbon fibers in the paste allows a very stiff component with high compression resistance leading to premature cracking or premature breaking of this insert. One additional advantage of a fiber paste is that it can accommodate to all surface irregularities during its deposition and by this prevents the presence of any porosities between the paste and the reinforcement element or between the paste and the fiber-reinforced polymer shell.

The fibers integrated inside the paste can be glass fiber, carbon fiber, basalt fiber, or the like such as silica fiber, or even vegetable fiber.

According to a preferred embodiment, the composite pressure vessel according to the invention comprises a blocking means located above the insert. Said blocking means is preferably a fiber disk impregnated with a third resin.

According to a preferred embodiment, the composite pressure vessel according to the invention comprises an intermediate reinforcing means located between the plastic liner and the unfolded external part of the intermediate reinforcement element. The intermediate reinforcing means allows a better transfer of the load in the reinforcement elements to the fiber-reinforced polymer shell enclosing the plastic liner reducing thus the shear stress. The intermediate reinforcing means allows a lower "equivalent connecting area" and thus an easier integration leading to a weight and volume gain. Preferably, the intermediate reinforcing means is a resin-impregnated mat. Compared to an intermediate reinforcing means made of metal such as steel or aluminum, an intermediate reinforcing means made of a resin-impregnated mat allows a weight gain. Preferably, the intermediate reinforcing means is made of the same material as the reinforcement element and/or the fiber-reinforced polymer shell enclosing the plastic liner. An intermediate reinforcing means made of similar material as the reinforcement element and/or the fiber-reinforced polymer shell enclosing the plastic liner allows a better integration in the composite pressure vessel leading to a better adhesion between the intermediate reinforcing means, the reinforcement element and a fiber-reinforced polymer shell enclosing the plastic liner. The intermediate reinforcing means, the reinforcement element and the fiber-reinforced polymer shell enclosing the plastic liner can be cured at the same time as the rest of the composite pressure vessel leading to a homogenized composite structure.

According to a preferred embodiment, the composite pressure vessel according to the invention is such that the continuous fibers of the unfolded external parts of at least two adjacent reinforcement elements are tangled. Tangled fibers of the unfolded external parts of at least two adjacent reinforcement elements allow a better load distribution increasing the pressure cycling resistance of the composite pressure vessel according to the addendum 109: regulation nr 110 dated 25 Jun. 2014 and addendum 133: regulation nr 134 dated 25 Jun. 2015 concerning the "Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions" of the United Nations. Moreover, this solution is particularly preferred if the reinforcement elements need to be close to one another.

According to a particular embodiment, the composite pressure vessel according to the invention is such that the outer parts of the hollow shaft are flared and form a depression on the external surface of the plastic liner adjacent to the central part of the hollow shaft. The depression in the shape of the liner permits advantageously that after the positioning of the reinforcement element, the presence of the depression, preferably having a flat surface, allows a descent winding of the fiber-reinforced polymer shell enclosing the plastic liner.

According to another particular embodiment, the composite pressure vessel according to the invention is such that a gas input or output is located in a hollow shaft.

It is another object of the present invention to provide a method for manufacturing a composite pressure vessel comprising the steps of:

Molding a plastic liner having kiss-points,
  Forming hollow shafts by cutting away the kiss-points,
  Inserting in the hollow shafts a reinforcement element comprising a central part and two external parts constituted by a plurality of continuous fibers impregnated with a first resin,
  Unfolding the external parts of the reinforcement element,
  Applying the external parts of the reinforcement element to the external surface of the plastic liner,
  Winding a fiber-reinforced polymer shell enclosing the plastic liner, preferably the fiber of the shell is impregnated with a second resin before, during or after the winding,
  Curing of the composite pressure vessel, According to a preferred embodiment, the method for manufacturing a composite pressure vessel according to the invention comprises a step of curing of the reinforcement element, preferably a step of partial curing of the reinforcement element. The step of curing of the reinforcement element, preferably a step of partial curing of the reinforcement element is preferably performed on the central part of the reinforcement element. Said step of curing of the reinforcement element, preferably said step of partial curing of the reinforcement element is performed by local heating (IR) or by UV curing. A step of impregnating of the fiber of the shell by a second resin is performed before the step of curing.

According to a particular embodiment, the method for producing a composite pressure vessel according to the invention comprises the step of inserting an insert in the unfolded external parts of the reinforcement element, preferably in the centre of the unfolded external parts of the reinforcement element. Preferably, a step of positioning a blocking means positioned above the insert is performed after the step of inserting the insert.

According to a preferred embodiment, the method for manufacturing a composite pressure vessel according to the invention comprises a step of applying an intermediate reinforcing means located between the liner and the unfolded external part of the reinforcement element, said step being performed before the step of unfolding the external parts of the reinforcement element According to a preferred embodiment, the method for manufacturing a composite pressure vessel according to the invention comprises a step of curing of the central part of the reinforcement element, said step of curing being performed before the step of inserting in the hollow shafts a reinforcement element comprising a central part and two external parts constituted by a plurality of continuous fibers impregnated with a polymer It is another object of the invention to provide a vehicle comprising a composite pressure vessel according to the invention detailed here above.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
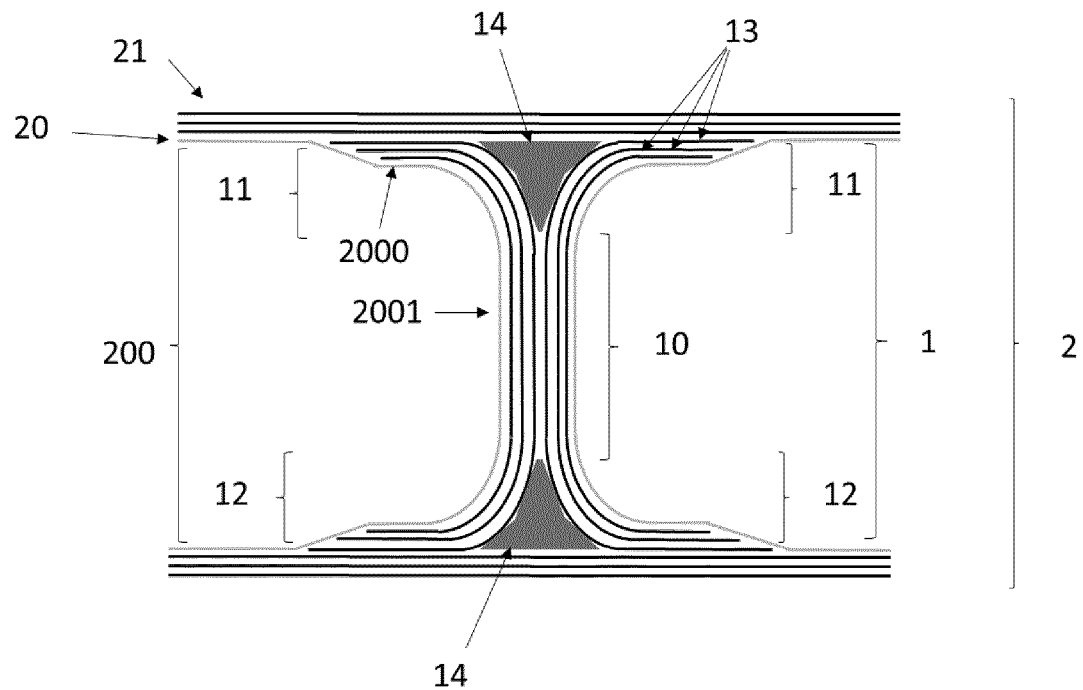
FIG. 1 is a vertical cross-section of a first embodiment of a reinforcement element according to the invention inserted in a composite pressure vessel.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

FIG. 1 is a vertical cross-section of a first embodiment of a reinforcement element (1) according to the invention inserted in a composite pressure vessel (2). The reinforcement element (1) comprises a central part (10) and two external parts (11, 12) constituted by a plurality of continuous fibers (13) impregnated with a first resin. The fibers (13) are in one piece all along the surface in contact with the liner (20) and are parallel to the profile of the surface of the liner (20), the lengths of the fibers (13) at the extremities of the external parts (11, 12) being such that they permit filling in the outer parts (2000) of the hollow shaft (200) that are flared and form a depression on the external surface of the plastic liner (20). The extremities of the external parts (11, 12) provided to be unfolded may preferably have a bevelled shape to maximize the contact with the liner (20). The reinforcement element (1) fills in a hollow shaft (200) of a plastic liner (20) of the composite pressure vessel (2), said hollow shaft (200) connecting opposite walls of the plastic liner (20). The central part (10) of the reinforcement element (1) has a dimension substantially equal to the dimension of the central part (2001) of the hollow shaft (200) and being a full part, the two external parts (11, 12) of the reinforcement element being able to be unfolded and fixed on the external surface of opposite walls of the plastic liner (20). The plastic liner (20) of the composite pressure vessel (2) comprises a fiber-reinforced polymer shell (21) enclosing the plastic liner (1), said fiber-reinforced polymer shell (21) being made of continuous fiber-reinforced composite matrix (210), comprising reinforcing fibers (2100) and a second resin matrix. The reinforcement element (1) comprises inserts (14) at the two external parts (11, 12). Said inserts (14) are located at the centre of the unfolded external parts (11, 12). Preferably, the inserts (14) are selected from the group of metallic insert and chopped carbon fibers paste insert. Advantageously, the inserts are made out of a compatible material with the first resin of the reinforcement element and/or the second resin of the fiber-reinforced polymer shell external composite.

Figure 2:
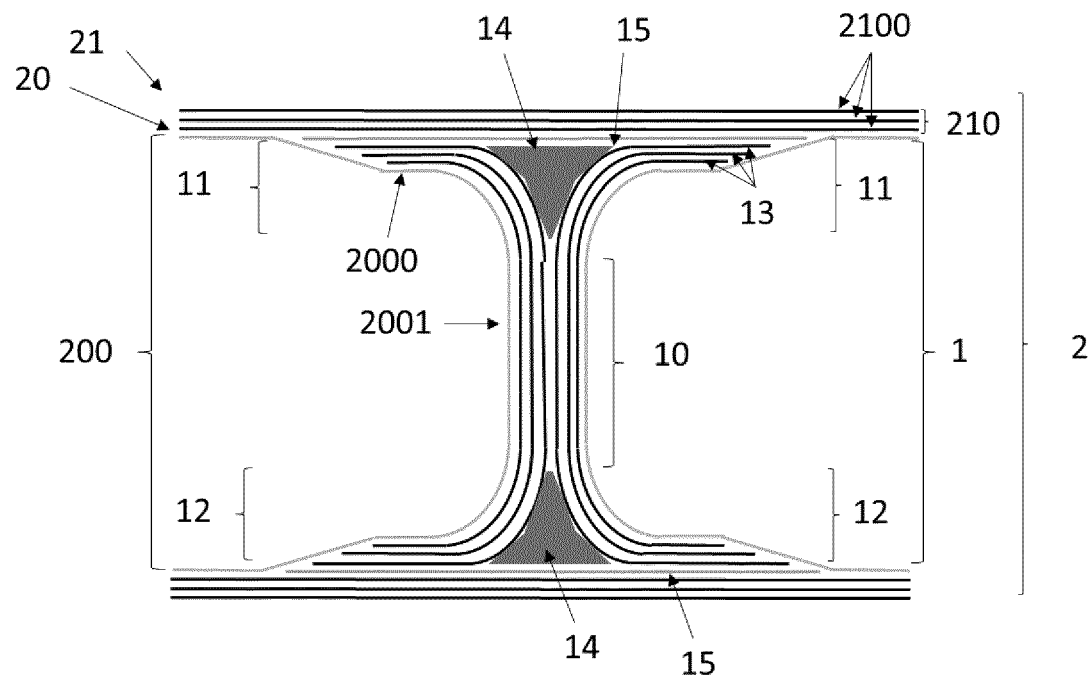
FIG. 2 is a vertical cross-section of a second embodiment of a reinforcement element according to the invention inserted in a composite pressure vessel.

FIG. 2 is a vertical cross-section of a second embodiment of a reinforcement element (1) according to the invention inserted in a composite pressure vessel (2). The reinforcement element (1) comprises a central part (10) and two external parts (11, 12) constituted by a plurality of continuous fibers (13) impregnated with a first resin. The fibers (13) are in one piece all along the surface in contact with the liner (20) and are parallel to the profile of the surface of the liner (20), the lengths of the fibers (13) at the extremities of the external parts (11, 12) being such that they permit filling in the outer parts (2000) of the hollow shaft (200) that are flared and form a depression on the external surface of the plastic liner (20). The extremities of the external parts (11, 12) provided to be unfolded may preferably have a bevelled shape to maximize the contact with the liner (20). The reinforcement element (1) fills in a hollow shaft (200) of a plastic liner (20) of the composite pressure vessel (2), said hollow shaft (200) connecting opposite walls of the plastic liner (20). The central part (10) of the reinforcement element (1) has a dimension substantially equal to the dimension of the central part (2001) of the hollow shaft (200) and being a full part, the two external parts (11, 12) of the reinforcement element being able to be unfolded and fixed on the external surface of opposite walls of the plastic liner (20). The plastic liner (20) of the composite pressure vessel (2) comprises a fiber-reinforced polymer shell (21) enclosing the plastic liner (1), said fiber-reinforced polymer shell (21) being made of continuous fiber-reinforced composite matrix (210), comprising reinforcing fibers (2100) and a second resin matrix. The reinforcement element (1) comprises inserts (14) at the two external parts (11, 12). Said inserts (14) are located at the centre of the unfolded external parts (11, 12). Preferably, the inserts (14) are selected from the group of metallic insert and chopped carbon fibers paste insert. Advantageously, the inserts are made out of a compatible material with the first resin of the reinforcement element and/or the second resin of the fiber-reinforced polymer shell external composite. The reinforcement element (1) comprises a blocking means (15) located above the insert (14). Said blocking means is preferably a fiber disk impregnated with a third resin.

Figure 3:
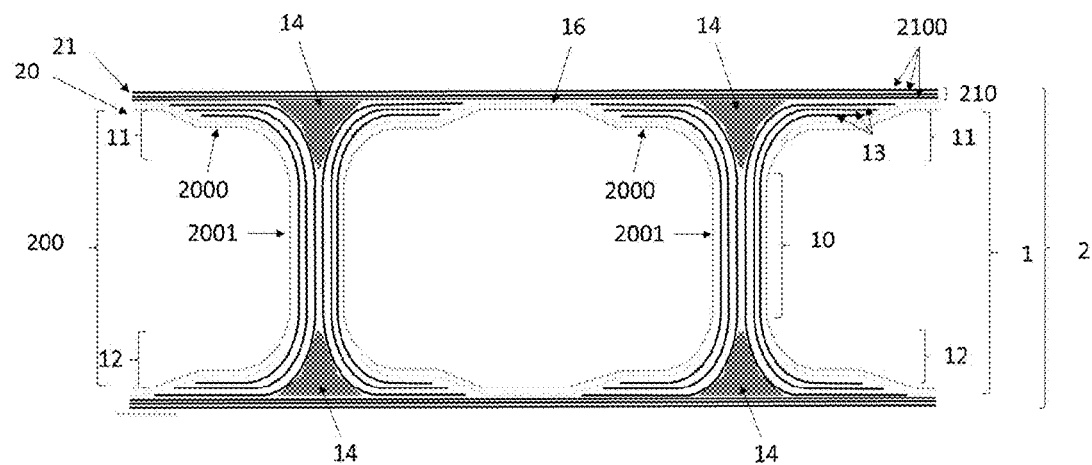
FIG. 3 is a partial vertical cross-section of a first embodiment of a composite pressure vessel according to the invention.

FIG. 3 is a partial vertical cross-section of a first embodiment of a composite pressure vessel (2) according to invention. The composite pressure vessel (2) comprises two reinforcement element (1) having a central part (10) and two external parts (11, 12) constituted by a plurality of continuous fibers (13) impregnated with a first resin. The fibers (13) are in one piece all along the surface in contact with the liner (20) and are parallel to the profile of the surface of the liner (20), the lengths of the fibers (13) at the extremities of the external parts (11, 12) being such that they permit filling in the outer parts (2000) of the hollow shaft (200) that are flared and form a depression on the external surface of the plastic liner (20). The extremities of the external parts (11, 12) provided to be unfolded may preferably have a bevelled shape to maximize the contact with the liner (20). The reinforcement element (1) fills in a hollow shaft (200) of a plastic liner (20) of the composite pressure vessel (2), said hollow shaft (200) connecting opposite walls of the plastic liner (20). The central part (10) of the reinforcement element (1) has a dimension substantially equal to the dimension of the central part (2001) of the hollow shaft (200) and being a full part, the two external parts (11, 12) of the reinforcement element being able to be unfolded and fixed on the external surface of opposite walls of the plastic liner (20). The outer parts of the hollow shaft (200) are flared and form a depression on the external surface of the plastic liner (20). The plastic liner (20) of the composite pressure vessel (2) comprises a fiber-reinforced polymer shell (21) enclosing the plastic liner (1), said fiber-reinforced polymer shell (21) being made of continuous fiber-reinforced composite matrix (210), comprising reinforcing fibers (2100) and a second resin matrix. The reinforcement element (1) comprises inserts (14) at the two external parts (11, 12). Said inserts (14) are located at the centre of the unfolded external parts (11, 12). Preferably, the inserts (14) are selected from the group of metallic insert and chopped carbon fibers paste insert. Advantageously, the inserts are made out of a compatible material with the first resin of the reinforcement element and/or the second resin of the fiber-reinforced polymer shell external composite. The composite pressure vessel comprises an intermediate reinforcing means (16) located between the plastic liner (20) and the unfolded external parts (11, 12) of the reinforcement element (1). Advantageously, the intermediate reinforcing means is a resin-impregnated mat. The intermediate reinforcing means (16) may cover several hollow shafts in this case, the intermediate reinforcing means (16) is provided with openings allowing the insertion of the reinforcement elements (1) in the hollow shafts (200).

Figure 4:
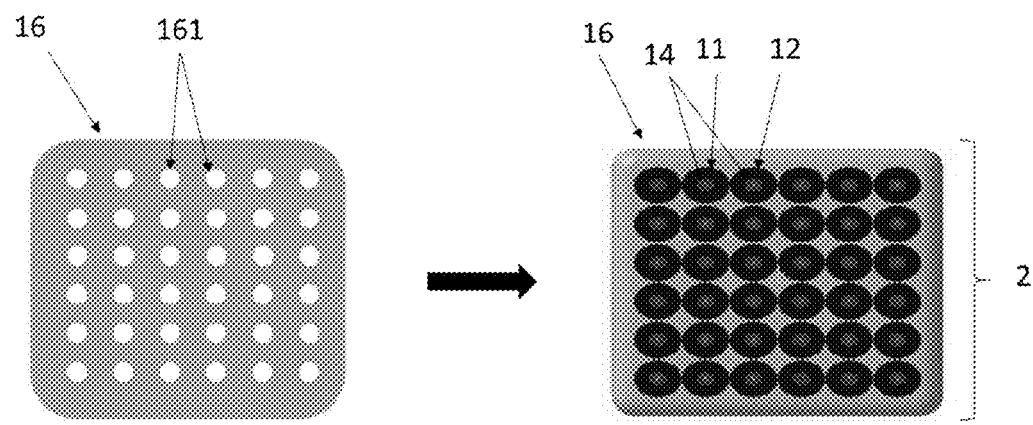
FIG. 4 is a view from the above showing the fixation step of an intermediate reinforcing means on the first embodiment of a composite pressure vessel according to the invention.

FIG. 4 is a view from the above showing the fixation step of the intermediate reinforcing means (16) on the first embodiment of a composite pressure vessel (2) according to the invention. The intermediate reinforcing means (16) comprises a plurality of openings (161). Each opening (161) of the intermediate reinforcing means is placed on the top of the opening end of the hollow shafts. A reinforcement element is inserted in each hollow shaft and the external parts (11,12) of the reinforcement element are unfolded. An insert (14) is inserted in the centre of the unfolded external parts (11, 12).

Figure 5:
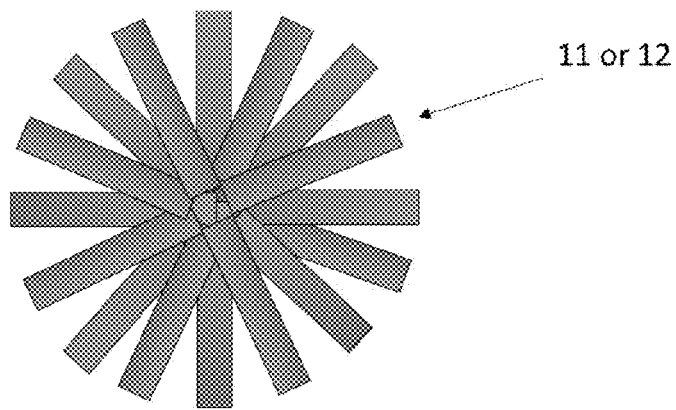
FIG. 5 illustrates the surface covered by an unfolded external part.

FIG. 5 illustrates the surface covered by an unfolded external part (11, 12).

Figure 6:
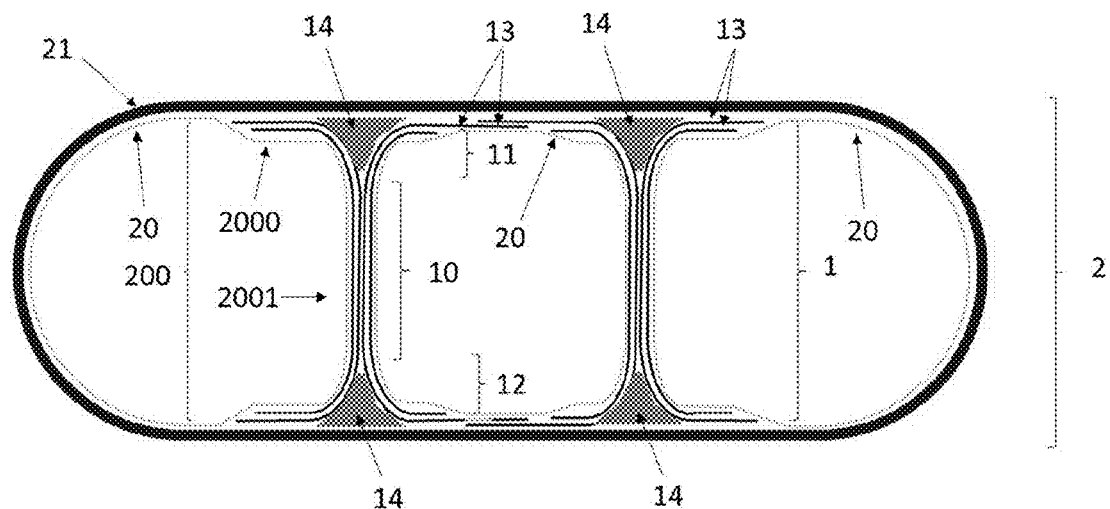
FIG. 6 is a vertical cross-section of a second embodiment of a composite pressure vessel according to the invention.

FIG. 6 is a vertical cross-section of a second embodiment of a composite pressure vessel (2) according to invention. The composite pressure vessel (2) comprises two reinforcement element (1) having a central part (10) and two external parts (11, 12) constituted by a plurality of continuous fibers (13) impregnated with a first resin. The fibers (13) are in one piece all along the surface in contact with the liner (20) and are parallel to the profile of the surface of the liner (20), the lengths of the fibers (13) at the extremities of the external parts (11, 12) being such that they permit filling in the outer parts (2000) of the hollow shaft (200) that are flared and form a depression on the external surface of the plastic liner (20). The extremities of the external parts (11, 12) provided to be unfolded may preferably have a bevelled shape to maximize the contact with the liner (20). The reinforcement element (1) fills in a hollow shaft (200) of a plastic liner (20) of the composite pressure vessel (2), said hollow shaft (200) connecting opposite walls of the plastic liner (20). The central part (10) of the reinforcement element (1) has a dimension substantially equal to the dimension of the central part (2001) of the hollow shaft (200) and being a full part, the two external parts (11, 12) of the reinforcement element being able to be unfolded and fixed on the external surface of opposite walls of the plastic liner (20). The outer parts of the hollow shaft (200) are flared and form a depression on the external surface of the plastic liner (20). The plastic liner (20) of the composite pressure vessel (2) comprises a fiber-reinforced polymer shell (21) enclosing the plastic liner (1), said fiber-reinforced polymer shell (21) being made of continuous fiber-reinforced composite matrix (210), comprising reinforcing fibers and a second resin matrix. The reinforcement element (1) comprises inserts (14) at the two external parts (11, 12). Said inserts (14) are located at the centre of the unfolded external parts (11, 12). Preferably, the inserts (14) are selected from the group of metallic insert and chopped carbon fibers paste insert. Advantageously, the inserts are made out of a compatible material with the first resin of the reinforcement element and/or the second resin of the fiber-reinforced polymer shell external composite. The continuous fibers (13) of the unfolded external parts (11, 12) of at least two adjacent reinforcement elements (1) are tangled.

Figure 7:
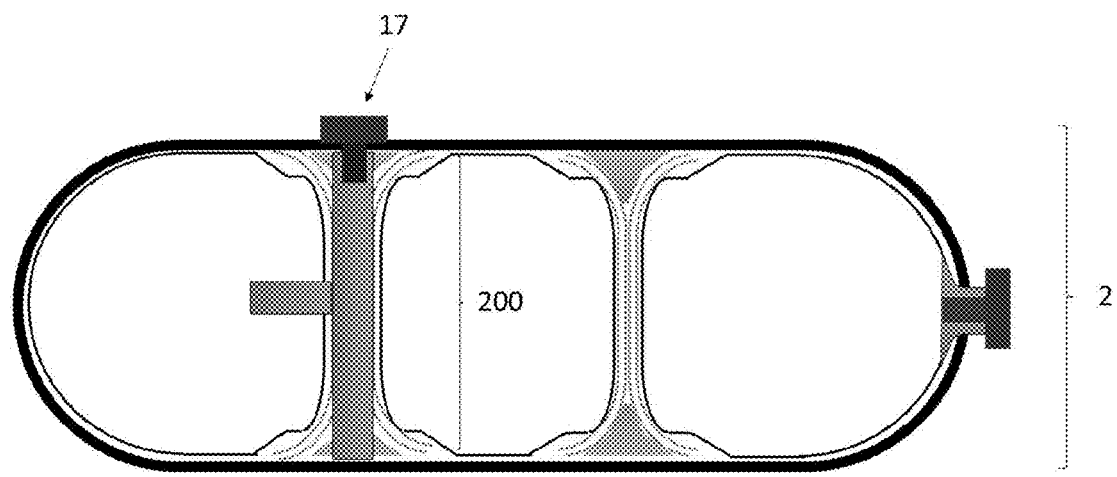
FIG. 7 is a vertical cross section of a composite pressure vessel according to the invention comprising a gas input or output located in a hollow shaft.

FIG. 7 illustrate a composite pressure vessel (2) according to the invention comprising a gas input or output (17 located in a hollow shaft (200).

Figure 8:
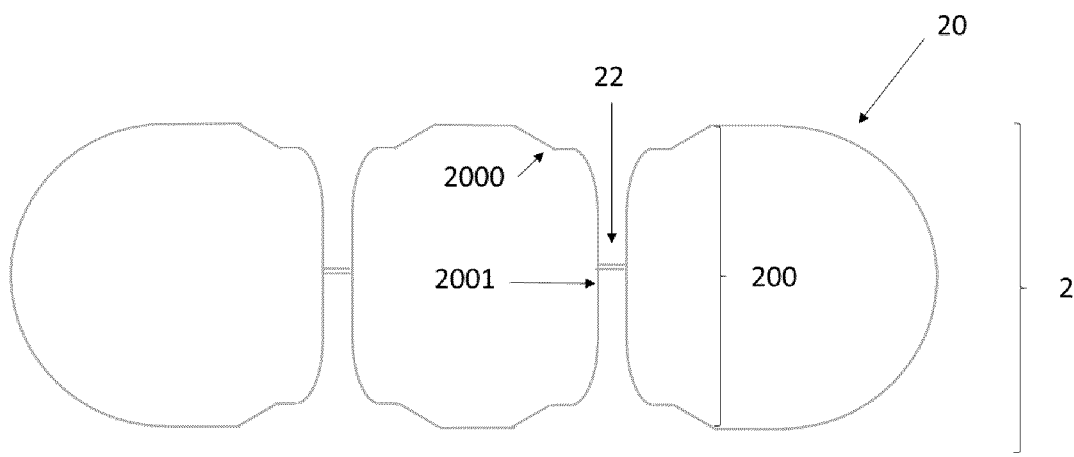
FIG. 8 is a vertical cross section illustrating the step of molding a plastic liner having kiss-points of the method of manufacturing a composite pressure vessel according to the invention.

FIG. 8 is a vertical cross section illustrating the step of molding a plastic liner (20) having kiss-points (22) of the method of manufacturing a composite pressure vessel (2) according to the invention. The hollow shafts (200) comprise a central part (2001) and outer parts (2000) that are flared and form a depression on the external surface of the plastic liner (20). The kiss point (22) are still present.

Figure 9:
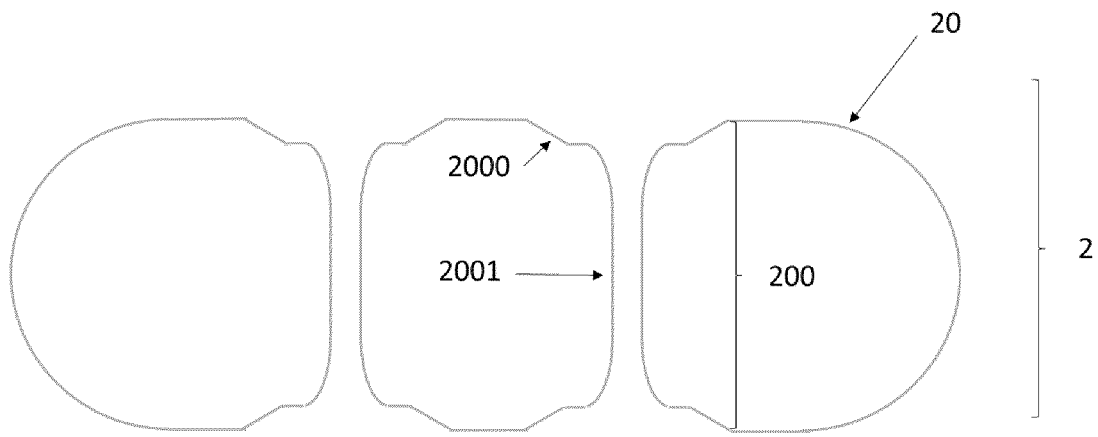
FIG. 9 is a vertical cross section illustrating the step of forming hollow shafts by cutting away the kiss-points of the method of manufacturing a composite pressure vessel according to the invention.

FIG. 9 is a vertical cross section illustrating the step of forming hollow shafts (200) by cutting away the kiss-points (22) of the method of manufacturing a composite pressure vessel (2) according to the invention. The hollow shafts (200) obtained comprise a central part (2001) and outer parts (2000) that are flared and form a depression on the external surface of the plastic liner (20). The central part of the hollow shafts are preferably tubular.

Figure 10:
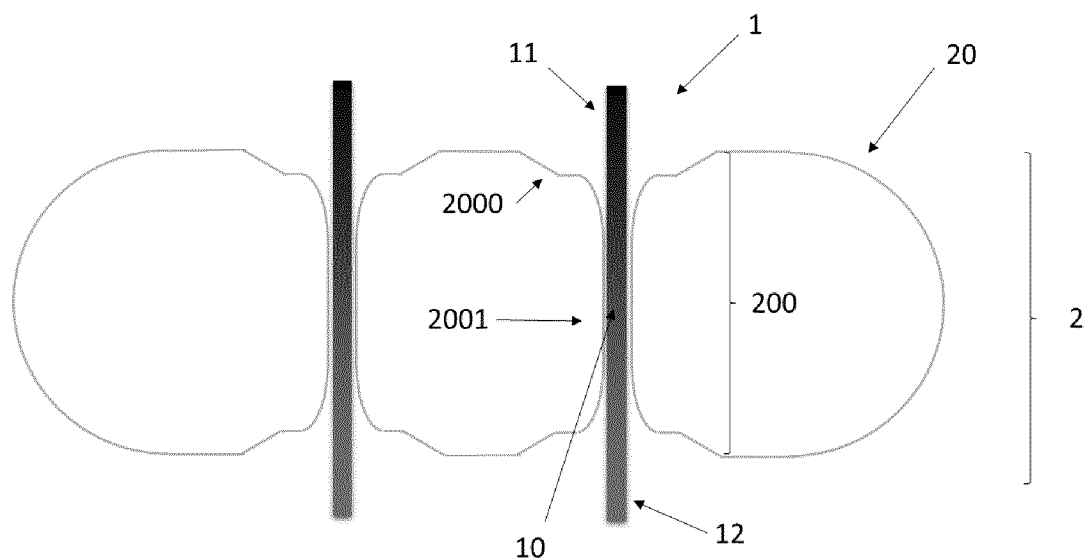
FIG. 10 is a vertical cross section illustration the step of inserting in the hollow shafts a reinforcement element comprising a central part and at least two external parts constituted by a plurality of continuous fibers impregnated with a first resin of the method of manufacturing a composite pressure vessel according to the invention.

FIG. 10 is a vertical cross section illustrating the step of inserting in the hollow shafts (200) a reinforcement element (1) comprising a central part (10) and at least two external parts (11, 12) constituted by a plurality of continuous fibers impregnated with a first resin of the method of manufacturing a composite pressure vessel (2) according to the invention.

Figure 11:
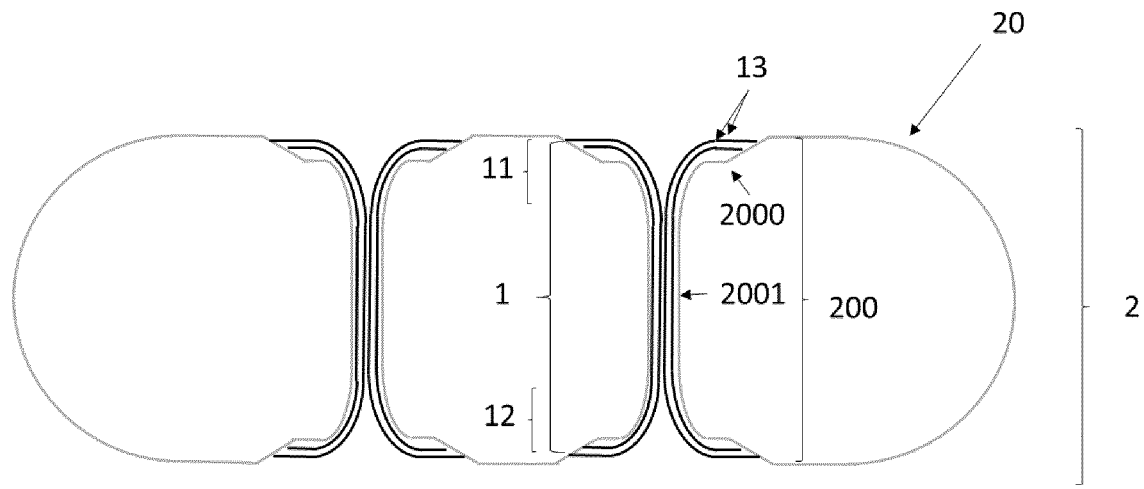
FIG. 11 is a vertical cross section illustrating the step of unfolding the external parts of the reinforcement element and applying the external parts of the reinforcement element to the external surface of the plastic liner of the method of manufacturing a composite pressure vessel according to the invention.

FIG. 11 is a vertical cross section illustrating the steps of unfolding the external parts (11, 12) of the reinforcement element (1) and applying the external parts (11, 12) of the reinforcement element (1) to the external surface of the plastic liner (2) of the method of manufacturing a composite pressure vessel (2) according to the invention.

Figure 12:
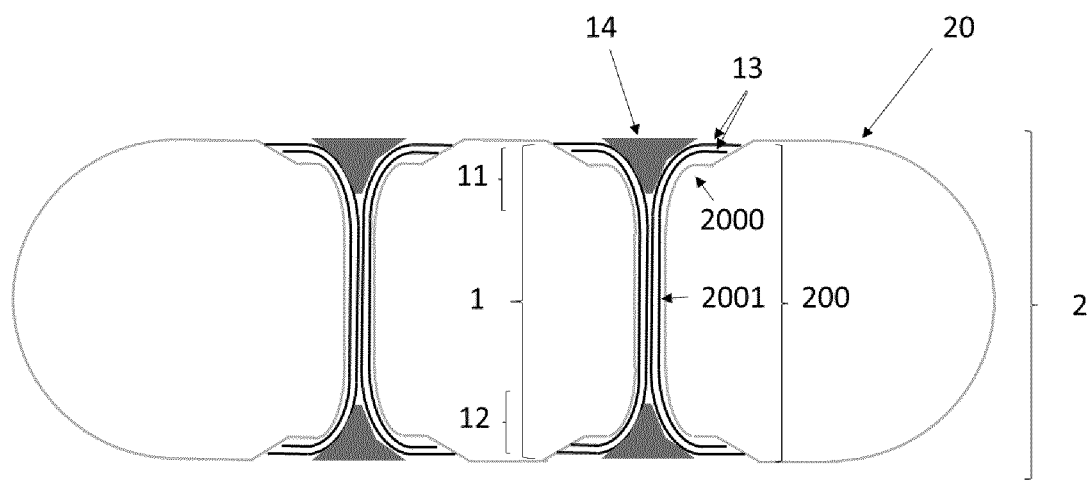
FIG. 12 is a vertical cross section illustrating the step of inserting an insert between the unfolded external parts of the reinforcement element of the method of manufacturing a composite pressure vessel according to the invention.

FIG. 12 is a vertical cross section illustrating the step of inserting an insert (14) between the unfolded external parts (11, 12) of the reinforcement element (1) of the method of manufacturing a composite pressure vessel (2) according to the invention.

Figure 13:
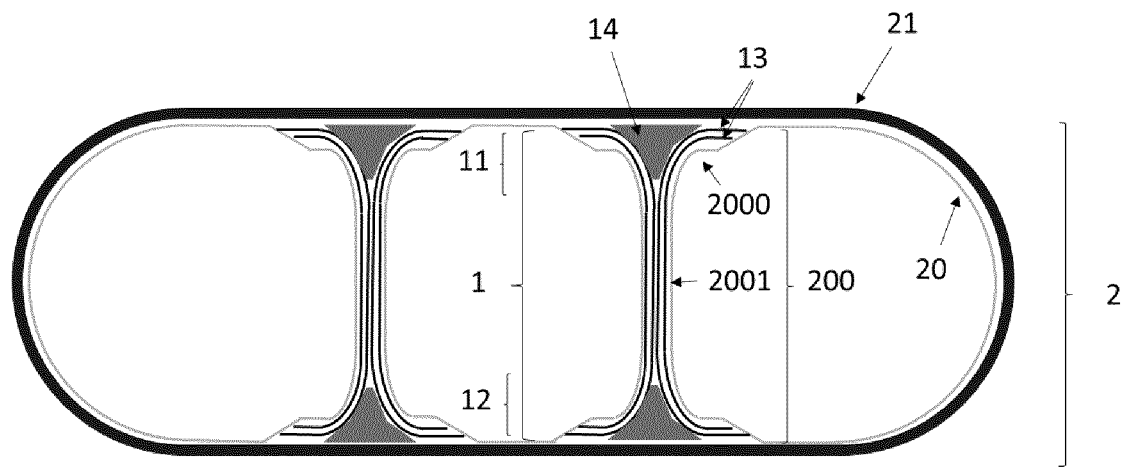
FIG. 13 is a vertical cross section illustrating the step of winding a fiber-reinforced polymer shell enclosing the plastic liner of the method of manufacturing a composite pressure vessel according to the invention.

FIG. 13 is a vertical cross section illustrating the step of winding a fiber-reinforced polymer shell (21) enclosing the plastic liner (20) of the method of manufacturing a composite pressure vessel (2) according to the invention.

Figure 14:
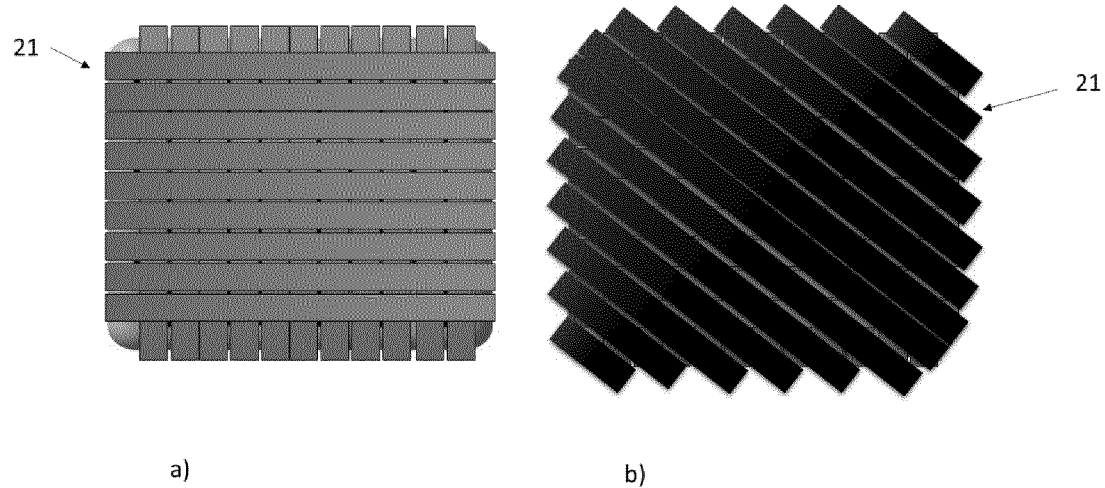
FIG. 14 a) and b) illustrate possible winding pattern of the fiber-reinforced polymer shell enclosing the plastic liner.

FIG. 14 a) and b) illustrate possible winding pattern of the fiber-reinforced polymer shell (21) enclosing the plastic liner.

Figure 15:
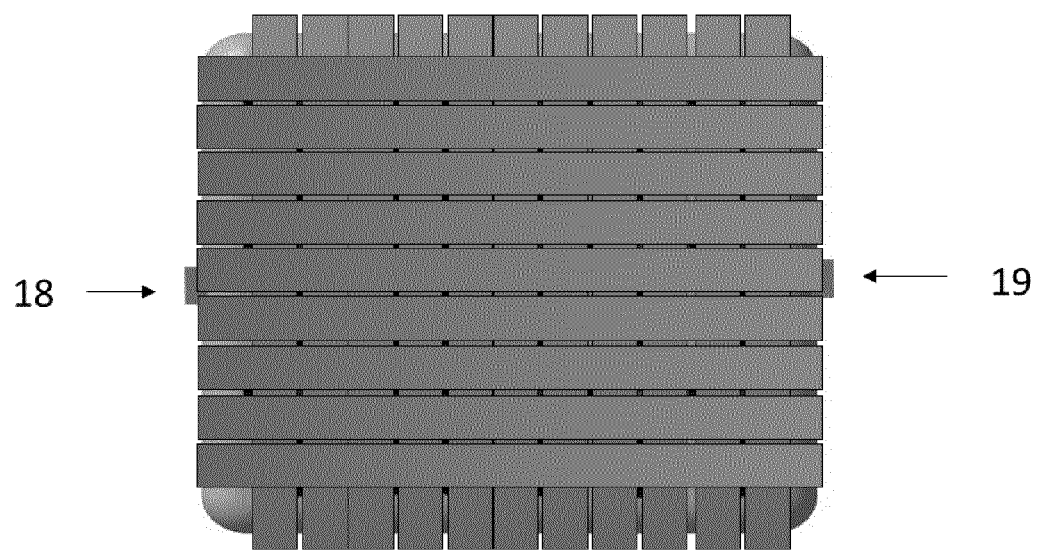
FIG. 15 is an illustration the possible location of the boss used as fixation point for the winding of the fiber-reinforced polymer shell.

FIG. 15 is an illustration the possible location of the boss used as fixation point for the winding of the fiber-reinforced polymer shell (21). Said fixation point being a one side boss (18, 19) and a "blind" boss, i. e. a boss without opening, located on the opposite side of the composite pressure vessel.

Figure 16:
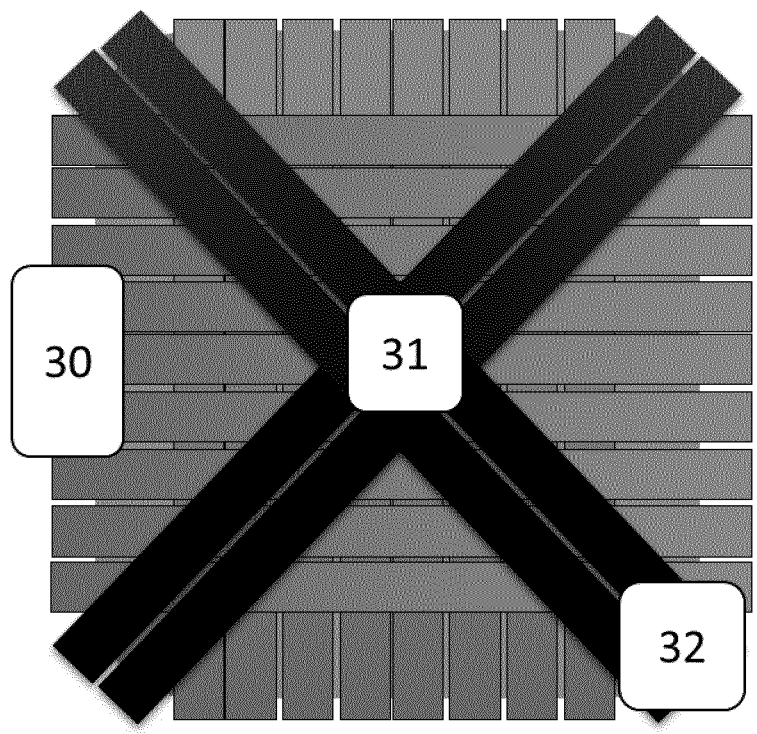
FIG. 16 illustrates possible locations of the gas input or output on the composite pressure vessel.

FIG. 16 illustrates possible locations of the gas input or output (30, 31, 32).

The invention claimed is:

1. A composite pressure vessel, comprising:
   (a) a plastic liner comprising pairs of opposite surfaces, the opposite surfaces of at least one of these pairs being connected by a plurality of hollow shafts whose ends are in one piece with these surfaces, the plastic liner forming opposite walls and further comprising a plurality of a reinforcement element comprising:
   a central part;
   a first external part and a second external part, each constituted by a plurality of continuous fibers impregnated with a first resin,
   the central part of the reinforcement element having a diameter substantially equal to a hollow shaft diameter of a central part of one or more of the hollow shafts transverse to a height of the one or more of the hollow shafts,
   the central part of the reinforcement element being filled with the continuous fibers impregnated with the first resin,
   the first and second external parts being unfoldable, in that the first and second external parts are formed such that all fibers of the plurality of continuous fibers impregnated with the first resin, at the first and second external parts of the reinforcement element, are flexible enough to be able to unfold so as to conform to the contour of the outer parts of the hollow shaft and cover an external surface of the opposite walls adjacent to the contour of the outer parts of the hollow shaft,
   the first and second external parts being fixable on the external surface of opposite walls of a plastic liner,
   the reinforcement element being configured to be inserted and to fill in the hollow shaft of the plastic liner of the composite pressure vessel, and
   the hollow shaft being configured to connect the opposite walls of the plastic liner,
   the plurality of the reinforcement element traversing the hollow shafts and connected to the external surfaces of the plastic liner adjacent to the central part of the hollow shafts;
   (b) a fiber-reinforced polymer shell enclosing the plastic liner, the fiber-reinforced polymer shell being made of continuous fiber-reinforced composite matrix, comprising reinforcing fibers and a second resin matrix,
   wherein the continuous fibers of the reinforcement element are parallel with an external surface of opposite walls of the plastic liner and the surface of the hollow shaft.

2. The composite pressure vessel of claim 1, further comprising:
   an insert, located at a center of the first or second external part, in unfolded form.

3. The composite pressure vessel of claim 2, wherein the insert is metallic.

4. The composite pressure vessel of claim 2, wherein the insert is a fiber-reinforced paste.

5. The composite pressure vessel of claim 1, further comprising:
   an intermediate reinforcing element located between the plastic liner and the first or second external part of the reinforcement element, in unfolded form.

6. The composite pressure vessel of claim 5, wherein the intermediate reinforcing element is a resin-impregnated mat.

7. The composite pressure vessel of claim 1, wherein the continuous fibers of the first and second external parts of at least two adjacent reinforcement elements are overlapped.

8. The composite pressure vessel of claim 1, wherein outer parts of the hollow shaft are flared and form a depression on the external surface of the plastic liner.

9. The composite pressure vessel of claim 1, wherein a gas input is located in at least one of the hollow shafts.

10. The composite pressure vessel of claim 1, wherein a gas output is located in at least one of the hollow shafts.

11. The composite pressure vessel of claim 1, wherein the first and second external parts as unfolded have a bevelled shape.

12. A method for manufacturing the composite pressure vessel of claim 4, the method comprising:
    molding the plastic liner comprising kiss-points;
    forming the hollow shafts by cutting away the kiss-points;
    inserting into the hollow shafts the reinforcement element comprising the central part and the first and second external parts;
    unfolding the first and second external parts of the reinforcement element;
    applying the first and second external parts of the reinforcement element to an external surface of the plastic liner;
    winding a fiber-reinforced polymer shell enclosing the plastic liner; and
    curing to obtain the composite pressure vessel.

13. The method of claim 12, further comprising:
    inserting an insert in the first or second external part of the reinforcement element, in unfolded form.

14. The method of the claim 12, further comprising:
    applying an intermediate reinforcing element, located between the plastic liner and the first or second external part of the reinforcement element, in unfolded form,
    wherein the applying is performed before the unfolding of the first and second external parts of the reinforcement element.

15. The method of claim 12, comprising:
    curing the central part of the reinforcement element before the inserting in the hollow shafts of the reinforcement element.

16. A vehicle, comprising:
    the composite pressure vessel of claim 1.

* * * * *